United States Patent [19]

Kanesaki et al.

[11] Patent Number: 4,610,833

[45] Date of Patent: Sep. 9, 1986

[54] PROCESS FOR PREPARING BIAXIALLY STRETCHED POLYESTER FILMS

[75] Inventors: Tateo Kanesaki, Nagahama; Shigeo Utsumi, Yokohama; Kichinojyo Tomitaka, Kawasaki, all of Japan

[73] Assignee: Diafoil Company, Limited, Tokyo, Japan

[21] Appl. No.: 606,780

[22] PCT Filed: Sep. 14, 1983

[86] PCT No.: PCT/JP83/00306

§ 371 Date: Apr. 18, 1984

§ 102(e) Date: Apr. 18, 1984

[51] Int. Cl.⁴ .............................................. B29C 55/14
[52] U.S. Cl. ................. 264/235.8; 264/290.2
[58] Field of Search ................ 264/290.2, 210.7, 235.8

[56] References Cited

U.S. PATENT DOCUMENTS

| | | | |
|---|---|---|---|
| 4,234,532 | 11/1980 | Motegi | 264/235.8 |
| 4,238,443 | 12/1980 | Levy | 264/290.2 |
| 4,370,291 | 1/1983 | Kazama et al. | 264/290.2 |
| 4,497,865 | 2/1985 | Minami | 264/290.2 |

Primary Examiner—James Lowe
Attorney, Agent, or Firm—Oblon, Fisher, Spivak, McClelland & Maier

[57] ABSTRACT

A process for preparing biaxially stretched polyester films comprising stretching an unstretched polyester film longitudinally so that the $\Delta n$ value becomes 0.030–0.055, further stretching the film in the same direction so that the $\Delta n$ value does not exceed 0.08 and the $\bar{n}$ value becomes 1.600 or less, and thereafter stretching the film transversely. The films prepared by the process of this invention are flat and slippery, less breakable and less uneven in thickness, and are especially suitable as the base film for video recording tapes.

8 Claims, 1 Drawing Figure

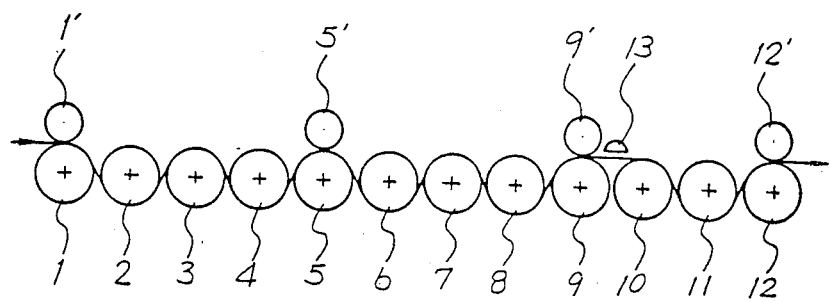

PROCESS FOR PREPARING BIAXIALLY STRETCHED POLYESTER FILMS

TECHNICAL FIELD OF THE INVENTION

This invention relates to a process for preparing biaxially stretched polyester films. More particularly, this invention relates to a process for preparing biaxially stretched polyester films which are flatter and more slippery and that less breakable and more uniform in thickness.

TECHNICAL BACKGROUND

Biaxially stretched polyester films are excellent in mechanical, thermal and electrical properties as well as chemical resistance and therefore are widely used in various fields. They are matched by no other polymer films especially for application as the base film for magnetic recording tapes. The quality of base films for magnetic tapes greatly influences the quality of the finished magnetic tapes and, therefore, quality standards required of base films for magnetic tapes are becoming higher and higher with progress in magnetic tape technology.

For instance, characteristics of a magnetic tape for video recording output, various S/N ratios, dropout, generation of envelop, etc. are related to flatness of the base film, whereas appearance of the wound-up tape, sliding property and wear resistance of a magnetic tape are closely related to the slipperiness of the base film. Thus, furnishing polyester films provided with both flatness and slipperiness is essential for production of magnetic tapes, especially those for video. Flatness and slipperiness are keenly desired characteristics of base films especially when a thinner magnetic layer or evaporated metal coating is employed in order to increase recording density.

The enhancement of the slipperiness of polyester films has hitherto been achieved by roughening the surface of the polyester film by externally incorporating or internally depositing minute particles. However, there is a limit in the effect of such methods in enhancement of flatness and they are not suitable for production of base films for high quality magnetic tapes for video recording in so far as the polyester films are produced under the conventional conditions. It has been considered that flatness and slipperiness are incompatible characteristics and that it is difficult to obtain a film satisfactory in the two characteristics in combination.

With respect to the polyester film represented by polyethylene terephthalate film, it has been known that biaxially stretched films excellent in slipperiness, which cannot be obtained by film-making at the ordinary stretching temperature, can be obtained by longitudinally stretching at a higher temperature. However, it is difficult to obtain a longitudinally stretched film with a uniform thickness by stretching an amorphous polyester film as prepared in single stage stretching at a higher temperature, since such a method generally increases irregularity in thickness, which eventually results in unevenness in thickness in the resulting biaxially stretched film. Multiple stage longitudinal stretching methods, which inhibit increase in thickness irregularity in the high temperature stretching are disclosed in Japanese Laying-Open Patent Publication No. 43772/73 and No. 122573/75. According to these high temperature longitudinal stretching processes, however, it is, at the highest, only up to the stretching temperature of 100° C. that generation of thickness uniformity is inhibited. The increase in thickness irregularity is unavoidable in stretching at higher temperatures. That is to say, although it is expected that a biaxially stretched film with excellent flatness and slipperiness may possibly be obtained by longitudinally stretching the film at a higher temperature, it is difficult to stretch a film at such a high temperature in the conventional stretching because are thickness unevenness increases. In the case of magnetic tape, especially video magnetic tape, the requirement in the thickness uniformity is very high. The commercial value of a magnetic tape is reduced if the tape is unsatisfactory in the thickness uniformity no matter how excellent it is in its other properties.

We proposed a new process by which films can be longitudinally stretched at high temperatures with little increase in the thickness irregularity in the longitudinal stretching stage in a biaxial stretching process in Laying-Open Patent Publication No. 78729/83. However, the thus obtained biaxially stretched polyester film is not entirely satisfactory in the thickness uniformity even though it is flat and slippery. Therefore, a further improved process has been desired.

We continued an intensive study and as a result we found that the thickness uniformity after longitudinal stretching is further improved, if the index of birefringence of the film Δn at an early stage of longitudinal stretching is enhanced. Thus this invention has been achieved.

In the process proposed in Laying-Open Patent Publication No. 78729/83, it was a problem in the stretching procedure that films tend to stick to heated drawing rolls at the last stage of the longitudinal stretching, that is, at the high-temperature drawing stage. Two approaches are conceivable for solving this problem, that is, modification of the roll material and modification of the physical properties of the film itself. We have it possible to enhance the non-tackiness of the film by improvement of the stretching procedure. There is disadvantage in the other approach, that is, modification of the roll material. If adherence is reduced, durability and other desirable properties of the roll is sacrificed. Therefore, roll material shall preferably be left unchanged.

DISCLOSURE OF THE INVENTION

The gist of this invention is a process for preparing polyester films characterized in that in the multiple stage longitudinal stretching of polyester films as prepared, the polyester film is first longitudinally stretched so that Δn is 0.030–0.055 (hereinafter optionally referred to as 'first step stretching'), then is stretched at a temperature of 95°–150° C. so that Δn becomes 0.080 or less and n̄ is becomes 1.600 or less (hereinafter optionally referred to as "latter step stretching"), whereafter the longitudinally stretched polyester film is transversely stretched. The index of birefringence Δn herein referred to means an average of the maximum value and the minimum value of the same film, and n̄ means the average index of refraction.

The polyester used in this invention is a polyester which contains at least 80% by weight of ethylene terephthalate units, and the remaining less than 20% by weight may be copolymerized units or another polymer or polymers. The polyester can contain a stabilizer such as phosphoric acid, phosphorous acid or esters thereof, an additive such as titanium dioxide, fine silica or kaolin or a lubricant.

In the process of this invention, a polyester film as prepared is first stretched longitudinally in one stage or in multiple stages so that Δn becomes 0.030–0.055. When Δn is less than 0.030, it is difficult to improve the thickness uniformity in the film after the latter stage longitudinal stretching has been finished, although a flat and slippery polyester film can be prepared. Flatness and slipperiness of a biaxially stretched film strongly depend upon the Δn value of the longitudinally stretched film, that is, the lower the Δn value, the better the flatness and slipperiness. However, as a longitudinally stretched film has a lower value of Δn, the thickness uniformity becomes deteriorated.

We checked the relation between the Δn value after the latter stage longitudinal stretching and stress when the higher Δn values are attained after the first stage longitudinally stretching, and we found that the stress steeply rises at the lower range of the Δn value. Thus we succeeded in preventing degradation of thickness uniformity by increasing the Δn value after the first stage longitudinal stretching even when the Δn after the latter stage longitudinal stretching is low.

In the meanwhile, it has been also made possible to produce high quality films excellent in flatness and slipperiness, free from surface defects caused by adherence to the drawing rolls and with less thickness irregularity as a result of the orientation crystallization of polyester films caused by enhancing Δn after the first stage longitudinal stretching.

Thus, if the Δn value after the first stage longitudinal stretching is not less than 0.030, orientation crystallization is caused in the polyester film, and thus the film is less tacky to the drawing rolls and the thickness uniformity after the longitudinal stretching is greatly improved.

If the Δn value is greater than 0.055, however, the stretching ratio at the latter stage longitudinal stretching has to be very small if the Δn value is to be retained low in the latter stage stretching. Thus the longitudinal thickness uniformity of the film is not improved, and the flatness of the biaxially stretched film becomes unsatisfactory if improvement in the thickness uniformity is intended.

The first stage longitudinal stretching, in which the Δn value is to be adjusted to 0.030–0.055, is preferably carried out in 1-3 steps. It is also carried out at a temperature 80°–130° C., preferably 85°–125° C. When the first stage stretching is carried out at a relatively low temperature, rolls of the ordinary quality will do. But when it is carried out at a higher temperature, the quality of the material of the drawing rolls should preferably be modified accordingly lest the film should stick to the drawing rolls. Although differing with the stretching temperature, the stretching ratio is 2.0–5.0 in the case of one-step stretching. In case of two- or three- step stretching, a higher stretching ratio can be employed if an orientation relaxation heat treatment step or steps are interposed during the stretching. The heat treatment for orientation relaxation may be effected in a short period of time at a temperature not lower than the stretching temperature and not higher than the crystallization starting temperature. However, this treatment is not desirable because it impairs the transverse stretch-ability and thus impairs productivity. It was found by our intensive study that reduction of the transverse stretchability can be avoided if the $\bar{n}$ (average index of refraction) value after the latter stage longitudinal stretching is not more than 1.600, preferably not more than 1.595. Here $\bar{n}$ is defined as follows.

$$\bar{n} = (n_\alpha + n_\gamma + n_\beta)/3$$

wherein
$n_\alpha$ = refractive index in the direction of thickness
$n_\gamma$ = refractive index in the direction of principal orientation
$n_\beta$ = refractive index in the direction transverse to the principal orientation direction In accordance with this invention, a longitudinally stretched polyester film having a Δn value of 0.030–0.055 is obtained by the first stage longitudinal stretching. Then the film is further longitudinally stretched at the latter stage at a temperature of 95°–150° C. so that the Δn value is not higher than 0.080. If the latter stage longitudinal stretching is carried out at a temperature lower than 95° C., flatness and slipperiness of the biaxially stretched film is not satisfactory. If it is carried out at a temperature higher than 150° C., crystallization is remarkably promoted and transverse stretchability is impaired. Further, it is important to carry out the latter stage longitudinal stretching so that the Δn value does not exceed 0.080. This is a considerably small value in view of the ordinary film-making technique, especially in the production of films for magnetic tapes. If the Δn value is higher than 0.080, the biaxially stretched films are unsatisfactory in flatness. If the Δn value is further higher, splitting frequently occurs in the subsequent transverse stretching. The stretching ratio in the latter stage longitudinal stretching should be 1.05–1.7, preferably 1.1–1.6. It is preferred to carry out the latter stage longitudinal stretching in one step as the last step longitudinal stretching in a short period of time.

The thus longitudinally stretched film is subjected to transverse stretching. That is, the film is transversely stretched by a factor of 2.5–4.5 at a temperature between 80° and 160° C. and is finally heat-set at a temperature between 180° and 245° C. so as to give a biaxially stretched film.

The process of this invention is able to provide flat and slippery films free from surface defects caused by sticking to drawing rolls without increasing thickness irregularity and therefore, is especially advantageous for production of base films for video recording tapes.

BRIEF DESCRIPTION OF THE DRAWING

The FIGURE represents a longitudinal stretching apparatus used in the working examples described hereinafter. In the drawing, members 5, 5' and 9, 9' are stretching nip rolls, members 6, 10 are stretching rolls and member 13 is an infrared radiation heater.

DESCRIPTION OF THE PREFERRED EMBODIMENT

The invention will now be illustrated by way of working examples. The methods employed for measuring the various properties of the films are as follows:

(1) Thickness uniformity

Thickness of a biaxially stretched film was measured by a continuous thickness measurement apparatus made by Anritsu Denki K. K. along the longitudinal center line of the film and the thickness irregularity is calculated as:

Thickness irregularity =

$$\frac{\text{Max. thickness of film} - \text{Min. thickness of film}}{\text{Average thickness of film}} \times 100(\%)$$

(2) Friction coefficient

A strip of film was brought into contact with the surface of a hard chromium plated roll 6 mm in diameter and 0.05 in a surface finish over an arc of 135° C. ($\theta$) and a load of 53 g ($T_2$) was applied to one end thereof. The strip was allowed to slide over the surface of the roll at the rate of 1 m/min. and the supporting force ($T_1(g)$) on the other end of the strip was measured. The kinetic friction coefficient ($\mu$) was determined in accordance with the following equation:

$$\mu = \frac{1}{\theta} \ln\left(\frac{T_1}{T_2}\right) = 0.42 \ln\left(\frac{T_1}{53}\right)$$

(3) Center line average roughness ($R_a$)

Surface roughness was measured using a surface roughness measuring apparatus SE-3FK made by Kosaka Kenkyuusho and the center line average value was calculated as follows:

The radius of curvature of the tip of the contact needle was 2 μm, and the needle pressure was 30 mg. A portion of a standard length L (2.5 mm) was taken from a film cross section curve along the center line. The portion was reproduced as a curve y=f(x) in a diagram with its center line as the abscissa and the vertical magnification ratio on the ordinate. The cutoff value was 80 μm. $R_a$ was measured on 5 points along the longitudinal line and 5 points on the transverse line and the average of the 10 points was determined.

$$R_a = \frac{1}{L} \int_0^L |f(x)| dx$$

(4) Intrinsic viscosity ([$\eta$])

To 200 mg of a sample, 20 ml of phenol/tetrachloroethane (50:50) mixture was added and the sample was dissolved by heating at about 110° C. for 1 hour. The viscosity of the solution was measured at 30° C.

(5) Index of birefringence

Retardation (R) was measured using a Carl Zeiss polarization microscope and the index of birefringence was calculated in accordance with the following equation:

$$\Delta n = \frac{R}{d},$$

wherein
<R: retardation
<d: thickness of film
(6) Refractive index

Refractive index was measured using an Abbe's refractometer against Na line. Principal refractive indices along the three axes $n_\gamma$, $n_\beta$, and $n_\alpha$ were measured respectively at five points at the central portion of the film and the average value $\bar{n}$ was calculated.

(7) Temperature of film

Temperature of a film portion being stretched was measured using an IR radiation thermometer made by Burns Corporation.

(8) Surface defect caused by sticking

The surface of a film was coated with evaporated aluminum and was observed by a Carl Zeiss differential interference microscope. Films having defects are indicated by x and those without defects are indicated by 0.

EXAMPLE 1

(Preparation of polyester)

One hundred (100) parts dimethyl terephthalate, 70 parts ethyleneglycol, 0.10 part calcium acetate monohydrate and 0.17 part lithium acetate dihydrate were placed in a reactor and heated. At the temperature rose, ester interchange proceeded and methanol was distilled away. After about 4 hours, the temperature reached 230° C. and the ester interchange reaction was substantially completed.

Triethyl phosphate (0.35 parts) was added to the reaction product, and 0.05 parts antimony trioxide was further added as a condensation polymerization catalyst. Thus the reaction product was polymerized into a polyester by the conventional process. Uniformly dispersed deposited fine particles 0.5–1μ in particle size including calcium and lithium and phosphorus were observed in the formed polyester. The intrinsic viscosity [$\eta$] of this polyester A was 0.65.

A polyester B containing almost no such internally deposited particles was prepared separately and was mixed with the above-described polyester at a ratio of 1:1 by weight and the mixture was used for making films.

(Film making)

An unstretched polyester was made into a biaxially stretched film by means of a longitudinal drawing apparatus as shown in the FIGURE and a tenter (a transverse stretching and heat-setting apparatus). Surface temperatures and materials of the rolls employed in Example 1 and Example 2 are shown in Table 1. The procedure of film making is described below in detail. The polyester as prepared was dried and melt-extruded into an unstretched film 160–200μ in thickness ([$\eta$]=0.62). The unstretched film was passed through the longitudinal drawing apparatus as shown in FIG. 1. The film was preheated by rolls 1–4 to 80° C. The preheated film was drawn between rolls 5, 5' and roll 6 by virtue of rotation speed difference by a factor of 1.9–2.5 as shown in Table 2 as the first stage longitudinal stretching. Thereafter, the film was further stretched between rolls 9, 9' and roll 10 by a factor of 1.1–1.7 as shown in Table 2 as the latter stage stretching. Incidentally, the film was heated by means of an IR radiation heater 13 between rolls 9, 9' and roll 10 and the temperature of a film portion which was being stretched at the latter stage stretching was measured on the back side by means of an IR radiation thermometer. The temperature was 110° C. The average refractive index of the thus longitudinally stretched film was determined. The longitudinally stretched film was then stretched transversely by a factor of 3.8 at 140° C. and finally was heat-set at 215° C. Thus a biaxially stretched film was obtained. The $\Delta n$ values and $\bar{n}$ values of the longitudinally stretched film and the properties of the obtained biaxially stretched films (Sample No. 1–5) are shown in Table 2.

TABLE 1

| Roll No. | Material of rolls | Surface temp. of rolls (°C.) | | |
|---|---|---|---|---|
| | | Sample No. 1-5 | Sample No. 6 | Sample No. 7-9 |
| 1-4 | Metal (hard chromium plated, mirror-polished) | 80 | 80 | 80 |
| 5 | (hard chromium plated, mirror-polished) | 90 | 90 | 90 |
| 6 | (hard chromium plated, mirror-polished) | 80 | 80 | 80 |
| 7, 8 | Fluorine-resin-coated | 80 | 100 | 100 |
| 9 | Fluorine-resin-coated | 105 | 93 | 105 |
| 10-12 | Metal (hard chromium plated, mirror-polished) | 30 | 30 | 30 |
| 1', 5', 9', 12' | Rubber-coated | Not heated | | |

TABLE 2

| Sample No. | Ratio of longitudinal stretching | | $\Delta n$ of longitudinally stretched film | | $\bar{n}$ of longitudinally stretched film | Properties of biaxially stretched films | | | | Remarks |
|---|---|---|---|---|---|---|---|---|---|---|
| | First stage | Latter stage | First stage | Latter stage | | Surface defect caused by sticking | Longitudinal thickness irregularity | $R_a$ | $\mu$ | |
| 1 | 1.9 | 1.7 | 0.023 | 0.065 | 1.5830 | x | 4.0 | 0.016 | 0.26 | Comparative example |
| 2 | 2.1 | 1.5 | 0.032 | 0.065 | 1.5835 | 0 | 3.3 | 0.015 | 0.26 | This invention |
| 3 | 2.1 | 1.7 | 0.032 | 0.083 | 1.5840 | 0 | 4.0 | 0.019 | 0.27 | Comparative example |
| 4 | 2.3 | 1.3 | 0.040 | 0.065 | 1.5835 | 0 | 4.2 | 0.014 | 0.26 | This invention |
| 5 | 2.5 | 1.1 | 0.058 | 0.065 | 1.5837 | 0 | 8.5 | 0.018 | 0.29 | Comparative example |

EXAMPLE 2

The same polyester as used in Example 1 was melt-extruded into an unstretched film 160–210μ in thickness the unstretched film was first longitudinally stretched by means of the longitudinal drawing apparatus as shown in FIG. 1 between rolls 5, 5' and roll 6 by a factor of 2.3 so that the Δn value became 0.04, was heat-treated by rolls 7, 8 heated at 100° C., and further stretched by rolls 9, 9' and roll 10 by a factor of 1.2–1.6 as the latter stage longitudinal stretching so that the Δn value becomes 0.060 as shown in Table 3. The surface temperature of each roll was shown in Table 1. The output of IR radiation heater 13 was regulated so that the surface temperature of the film which was subjected to the latter stage stretching was varied between 93° and 152° C. as shown in Table 1, and thus longitudinally stretched films were obtained. These films were transversely stretched and heat-set under the same conditions as in Example 1. The $\bar{n}$ values of the longitudinally stretched films and properties of the biaxially stretched films (Sample No. 6–9) are shown in Table 3. No surface defect due to sticking was observed in all the Samples No. 6–9.

EXAMPLE 3

Polyester material A and polyester material B described in Example 1 were mixed at a ratio 4:6 (by weight) and was used as the material for film making. From this material, an unstretched film 160–200μ in thickness ([η]=0.62) was prepared in the same way as in Example 1. The film was then passed through the longitudinal stretching apparatus shown in FIG. 1 so as to be stretched, wherein rolls of materials and temperatures indicated in Table 4 were used. That is, films were preheated at 85° C. by rolls 1–4, and were stretched by a factor of 2.8–3.7 between rolls 5, 5' and roll 6 by virtue of rotation speed difference between the rolls as the first stage stretching as shown in Table 5. Then the films were further stretched by a factor of 1.1–1.7 between rolls 9, 9' and roll 10 as the latter stage stretching as shown in Table 5. The film temperature was 110° C. at the latter stage stretching position. The thus obtained longitudinally stretched films were transversely stretched by a factor of 3.8 at 140° C. by means of a tenter and were heat-set at 215° C. Thus biaxially stretched films 15μ in thickness were obtained. The Δn values and $\bar{n}$ values of the longitudinally stretched films and the properties of the biaxially stretched films (Samples No. 10–14) are shown in Table 5.

TABLE 4

| Roll No. | Materials of rolls | Surface temp. of rolls (°C.) |
|---|---|---|
| 1-2 | Metal (hard chromium plated, mirror-polished) | 80 |
| 3-4 | Ceramic | 85 |
| 5 | Fluorine-resin-coated | 105 |
| 6 | Metal (hard chromium plated, mirror-polished) | 80 |
| 7-8 | Ceramic | 85 |
| 9 | Fluorine-resin coated | 105 |
| 10-12 | Metal (hard chromium plated, mirror-polished) | 30 |
| 1', 5', | Rubber coated | Not heated |

TABLE 3

| Sample No. | Film temp. at latter stage longitudinal stretching (°C.) | Ratio of longitudinal stretching | | $\bar{n}$ of longitudinally stretched films | Properties of biaxially-stretched films | | Remarks |
|---|---|---|---|---|---|---|---|
| | | First stage | Latter stage | | $R_a$ | $\mu$ | |
| 6 | 93 | 2.3 | 1.6 | 1.5840 | 0.020 | 0.31 | Comparative example |
| 7 | 112 | 2.3 | 1.5 | 1.5860 | 0.015 | 0.25 | This invention |
| 8 | 134 | 2.3 | 1.25 | 1.5902 | 0.013 | 0.23 | This invention |
| 9 | 152 | 2.3 | 1.2 | 1.6010 | Generation of necking in transverse stretching | | Comparative example |

TABLE 4-continued

| Roll No. | Materials of rolls | Surface temp. of rolls (°C.) |
|---|---|---|
| 9', 12' | | |

TABLE 5A

| Sample No. | Ratio of longitudinal stretching | | Δn of longitudinally stretched films | | $\bar{n}$ of longitudinally stretched films |
|---|---|---|---|---|---|
| | First stage | Latter stage | First stage | Latter stage | |
| 10 | 2.8 | 1.7 | 0.023 | 0.065 | 1.5840 |
| 11 | 3.2 | 1.4 | 0.032 | 0.065 | 1.5860 |
| 12 | 3.2 | 1.55 | 0.032 | 0.085 | 1.5870 |
| 13 | 3.4 | 1.3 | 0.040 | 0.065 | 1.5860 |
| 14 | 3.7 | 1.1 | 0.058 | 0.065 | 1.5865 |

TABLE 5B

| Sample No. | Properties of biaxially stretched films | | | Factor of longitudinal stretching | Remarks |
|---|---|---|---|---|---|
| | Thickness irregularity (%) | $R_a$ | $\mu$ | | |
| 10 | 9.0 | 0.017 | 0.26 | 4.76 | Comparative example |
| 11 | 3.5 | 0.015 | 0.26 | 4.48 | This invention |
| 12 | 3.8 | 0.019 | 0.27 | 4.96 | Comparative example |
| 13 | 4.0 | 0.016 | 0.25 | 4.42 | This invention |
| 14 | 8.3 | 0.020 | 0.29 | 4.07 | Comparative example |

We claim:

1. A process for preparing a uniformly flat and slippery biaxially stretched film, which comprises the steps of:
   (a) subjecting an unstretched polyester film to a first stage single longitudinal stretching to attain a Δn value of 0.030–0.055,
   (b) subjecting said polyester film to a later stage longitudinal stretching at a temperature of from 95° C. to 150° C. to attain a Δn value of not more than 0.080, an $\bar{n}$ of not more than 1.600, and a stretching ratio of from 1.05 to 1.7,
   (c) stretching said polyester film transversely, and
   (d) finally, heat setting said polyester film at a temperature between 180° C. and 245° C., wherein between steps (c) and (d) there are no intervening steps.

2. The process of claim 1, wherein said first stage single longitudinal stretching is conducted at a temperature from 80° C. to 130° C.

3. The process of claim 1, wherein said single longitudinal stretching is characterized by a stretching ratio of from 2.0 to 5.0.

4. The process of claim 1, wherein said $\bar{n}$ value is not more than 1.595.

5. The process of claim 1, wherein said stretching ratio is from 1.1 to 1.6.

6. The process of claim 1, wherein said film is stretched transversely by a factor of 2.5 to 4.5.

7. The process of claim 1, wherein said film is stretched transversely at a temperature of from 80° C. to 160° C.

8. The process of claim 1, wherein said polyester film is a polyester which contains at least 80% by weight of ethylene terephthalate units.

* * * * *